(12) United States Patent
Gerndorf et al.

(10) Patent No.: US 8,360,493 B2
(45) Date of Patent: Jan. 29, 2013

(54) PILLAR COVER WITH FIXEDLY ALLOTTED COVER LIP

(75) Inventors: Ralf Gerndorf, Finnentrop (DE); Jochen Schulze Zur Wiesche, Cologne (DE); Norfried Bittner, Witten (DE); Axel Nusken, Altena (DE); Martin Schulte, Balve (DE)

(73) Assignee: DURA Automotive Body & Glass Systems GmbH, Plettenberg (DE)

( * ) Notice: Subject to any disclaimer, the term of this patent is extended or adjusted under 35 U.S.C. 154(b) by 105 days.

(21) Appl. No.: 12/823,026

(22) Filed: Jun. 24, 2010

(65) Prior Publication Data

US 2011/0148139 A1    Jun. 23, 2011

(30) Foreign Application Priority Data

Jun. 29, 2009 (DE) .......... 10 2009 026 069

(51) Int. Cl.
*B62D 25/04* (2006.01)
(52) U.S. Cl. ..................................... 296/1.08
(58) Field of Classification Search ............... 296/146.1, 296/146.2, 146.9, 146.15, 146.16, 93; 49/489.1, 49/500.1
See application file for complete search history.

(56) References Cited

U.S. PATENT DOCUMENTS

| | | | |
|---|---|---|---|
| 4,650,240 A * | 3/1987 | Rinella | 296/93 |
| 4,703,973 A * | 11/1987 | Fujikawa | 296/201 |
| 5,072,545 A | 12/1991 | Nozaki | |
| 5,092,078 A * | 3/1992 | Keys | 49/441 |
| 5,168,668 A * | 12/1992 | Mishima et al. | 49/440 |
| 5,199,761 A * | 4/1993 | Dannecker et al. | 296/146.16 |
| 6,103,168 A * | 8/2000 | Kelly | 264/259 |
| 6,205,712 B1 * | 3/2001 | Ellis | 49/441 |
| 6,279,987 B1 | 8/2001 | Keeney et al. | |
| 7,210,730 B2 * | 5/2007 | Fujita et | 296/146.5 |
| 8,127,501 B2 * | 3/2012 | Nakao et al. | 49/502 |

FOREIGN PATENT DOCUMENTS

| | | |
|---|---|---|
| DE | 4142599 A1 | 6/1993 |
| DE | 19736899 A1 | 3/1999 |
| DE | 19741538 A1 | 3/1999 |
| DE | 20201528 U1 | 6/2003 |
| DE | 102006022505 A1 | 11/2007 |
| EP | 0684158 A1 | 11/1995 |
| EP | 1584517 A2 | 10/2005 |
| JP | 2004338522 A * | 12/2004 |
| JP | 2009023630 A * | 2/2009 |
| WO | WO 2008133115 A1 * | 11/2008 |

\* cited by examiner

*Primary Examiner* — H Gutman
(74) *Attorney, Agent, or Firm* — Stetina Brunda Garred & Brucker

(57) ABSTRACT

The invention relates to a pillar finisher which is arranged to visually conceal regions of a vehicle body and with its outer exposed surfaces to be involved in forming the external appearance of a vehicle, wherein the pillar finisher in the intended final installed state forms a mount for a functional seal, in particular a window drop seal. To prevent a malposition of the functional seal relative to the pillar finisher from having negative effects with regard to the function of the seal or the quality impression of the mounted assembly, provision is made that a covering lip, functionally separate from the position of the functional seal, is fixedly associated with the pillar finisher on the edge side.

5 Claims, 2 Drawing Sheets

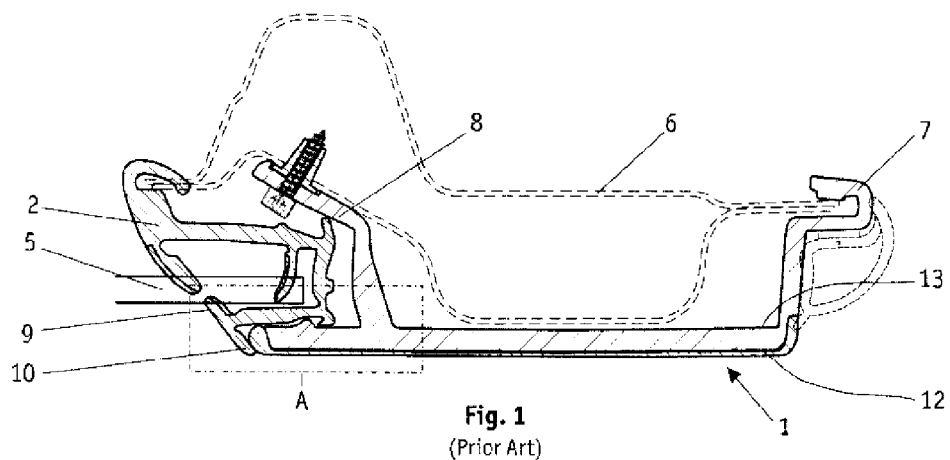
Fig. 1
(Prior Art)
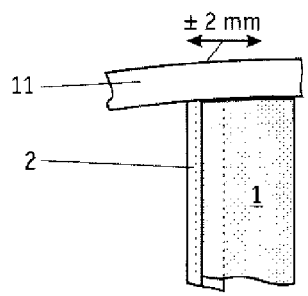
Fig. 2
(Prior Art)
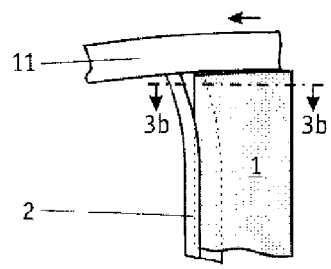 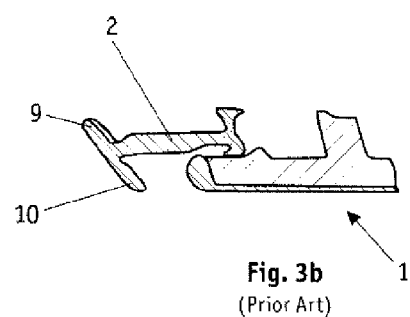
Fig. 3a
(Prior Art)
Fig. 3b
(Prior Art)
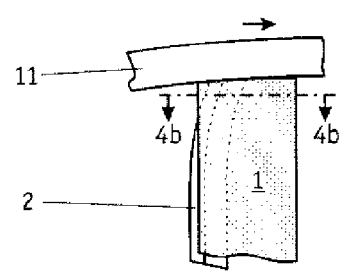 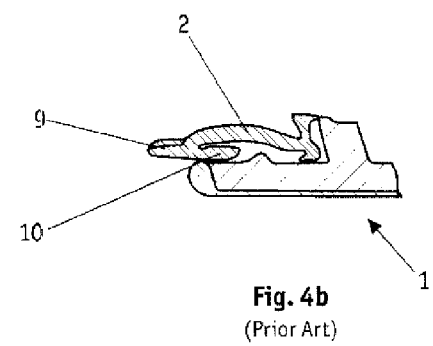
Fig. 4a
(Prior Art)
Fig. 4b
(Prior Art)

PILLAR COVER WITH FIXEDLY ALLOTTED COVER LIP

CROSS-REFERENCE TO RELATED APPLICATIONS

The present application claims priority to German Patent Application Serial No. DE 10 2009 026 069.2 filed on Jun. 29, 2009, the entire contents of which are incorporated herein by reference.

STATEMENT RE: FEDERALLY SPONSORED RESEARCH/DEVELOPMENT

Not Applicable.

BACKGROUND

The invention relates to a pillar finisher which is arranged in order to visually cover regions of a vehicle body and with its outer exposed surfaces to be involved in forming the external appearance of a vehicle, wherein the pillar finisher in the intended final installed state forms a mount for a functional seal, in particular a window drop seal.

BRIEF SUMMARY

Pillar finishers of this type are known inter alia from EP 1 584 517. They are placed onto the basic body in the door region, in order to ensure an attractive appearance of the vehicle. In addition, they serve to receive functional elements such as seals. They bridge gaps forming, due to the construction, between adjacent parts of the body and provide for an outer surface of the vehicle which is as even as possible and therefore has as low an air resistance and wind noise as possible. The known pillar finishers here in the final installed state either form, on their own or, as also shown in EP 1 584 517, together with adjoining regions of the body, a mount for the said functional seals. These functional seals can be, in particular, window drop seals.

It is necessary for the transitions from the edge of the pillar finisher to the window or respectively to the adjoining vehicle body to be embodied so as to be as free of gaps as possible, by seals which sit in an optimum manner. Firstly, this serves for the production of a smooth outer surface of the vehicle, which is necessary for a low air resistance value and for the avoidance of wind noises; secondly, this is important for the impression of high quality, which is always aimed for. This is attempted to be achieved in that parts of the functional seals embrace the edge regions of the pillar finisher, which due to construction and tolerance always have a distance from the adjoining outer surface of the vehicle, forming a gap, and at the same time extend up to the outer surface of the vehicle. The gap which is regularly present between the outer surface of the vehicle and the pillar finisher is therefore closed.

As regards their intended position on the vehicle, the functional seals, which are at least also held by the column finisher are, however, not associated with the pillar finisher, but rather with the body or with other components, and with regard to positional tolerances and possible measures for tolerance compensation they are therefore also constructed and dimensioned in relation to these components and not in relation to the pillar finisher. For example, a window drop seal which embraces the edge region of a side window and permits its sliding along or within the seal on opening and closing of the side window, is securely connected with the window seal on the upper side, which in the closed state of the window lies in a sealing manner against its upper edge. The dimensional and fit tolerances of these soft plastic parts are relatively coarse and amount to up to a few millimeters. In addition, it is very important to construct these parts such that the problem-free movement and sealing of the window is also ensured in the corner regions and an optimum fitting into the door frame. Consideration can scarcely be given here to the pillar finisher and its dimensional and fit tolerances.

In many cases, this leads to the precise position or respectively alignment of the functional seal being faulty in relation to the pillar finisher holding the functional seal. Depending on the type and direction of the malposition, undesired cracking or squeezing of the functional seal occurs. These can cause wind noises, can impair the opening and closing movement of the side window or can jeopardize the tightness of the entire window construction. In addition to this is the fact that a poor quality impression is produced when the functional seal and the pillar finisher are not aligned to each other in a visually acceptable manner. This applies in particular to pillar finishers which, because they are arranged in the door region, are situated in the immediate field of vision of the vehicle user every time he gets in and out. The impression caused by a faulty alignment is therefore to be avoided at all costs.

The additional work caused by the described malposition forms a further problem. The fitter who notices such a malposition during the vehicle production will aim to rectify this. This can only be brought about with difficulty owing to the structural complexity of the overall system of door, body, pillar finisher, window and sealing elements, and of course leads to a delay in the production process.

It is therefore an object of the invention to provide a pillar finisher which is simple to mount and which as far as possible minimizes the risk of malpositions of the functional seal relative to the pillar finisher, or which can at least visually conceal such a malposition. Negative effects of a malposition for the functioning of the seal or the impression of quality of the mounted assembly are to be avoided.

This problem is solved according to the invention in that a sealing lip, which is functionally separated from the position of the functional seal, is fixedly associated with the pillar finisher on the edge side.

Hereby, it is ensured that a malposition of the functional seal, not orienting itself to the pillar finisher with regard to its dimensional and fit tolerances, is no longer significant for the visual and functional interplay between the pillar finisher and the functional seal. The visual or functional impairments mentioned above, which such a malposition could cause, are ruled out as far as possible. On assembly, the fitter mounting the functional seal and/or the pillar finisher will no longer have to monitor a now virtually ruled out malposition, and will also no longer have to carry out any complex corrections of a malposition.

The expression "fixedly associated" is intended in this case to mean that the covering lip orients itself with regard to its position against the pillar finisher. The covering lip is therefore an element which is functionally independent of the position of the functional seal, with its intended required position relative to the pillar finisher being maintained even in the case of a faulty misalignment of the functional seal relative to the pillar finisher. The sealing lip can also be part of the functional seal here, as long as the connection between the covering lip and the functional seal is flexible and/or elastic such that a malposition of the functional seal existing relative to the pillar finisher does not impair the position of the covering lip relative to the pillar finisher.

Embodiments which are regarded as advantageous make provision that the covering lip is able to visually conceal the edge region of the functional seal facing the exterior of the vehicle. Inter alia for this purpose, the covering lip is to engage if possible over the edge region of the functional seal facing the exterior of the vehicle. The covering lip can therefore bridge and close the gap between the edge of the pillar finisher and the immediately adjoining outer surface of the vehicle. An as far as possible smooth and visually attractive and also aerodynamically efficient transition is produced between the outer surface of the vehicle and the pillar finisher surface.

In the described embodiment, provision can be made in particular that the covering lip is part of a sealing strip separate from the functional seal, which is securely connected with the pillar finisher. The sealing strip and the pillar finisher are preferably glued to each other here. However, at this point it is to be mentioned that the sealing strip itself only has the task of forming the covering lip and of offering a possibility for securely connecting this, as a generally very narrow elongated component, with the pillar finisher. The sealing strip therefore does not imperatively have to fulfill a sealing function here with respect to another component.

A further possibility consists in that the covering lip is injected directly on the pillar finisher. This can be achieved for example in that laterally to the pillar finisher frame, which is still located in the injection molding tool, by drawing of a mould core or by changing of a tool jaw following the injection molding process producing the pillar finisher frame, a new cavity is freed for the covering lip, into which the material forming the covering lip is then injected.

The covering lip is preferably produced here from a soft plastic which differs from the material of the pillar finisher. A soft plastic is preferred as it is also used for functional seals of any kind. This choice, together with the optimal alignment of the components owing to the fixed association of the covering lip to the pillar finisher, creates the visual impression of a seal which is sitting perfectly and therefore that of a particularly high quality of processing. Inter alia for the same reason, provision can be made that the covering lip is embodied in the manner of a sealing lip of the functional seal.

The above variant embodiments have, in addition, the advantage that with such a choice of material and construction, the covering lip can also undertake sealing functions. Even if, as is preferably provided, this is connected with the pillar finisher and positioned thereon such that the edge of the covering lip facing the window pane runs at a distance substantially parallel to the surface of the window pane, the covering lip can, in addition to the visual upgrading, at least undertake a function protecting the functional seal from coarse dirt. The distance from the surface of the window pane is preferably between a few tenths of a millimeter to a few millimeters and should not exceed 2 millimeters. A distance of between a half and one millimeter is regarded as being particularly suitable. Hereby, a virtually gap-free transition is ensured from the surface of the window pane to the surface of the pillar finisher.

A further advantage of the use of the soft plastics mentioned for the covering lip is that a covering lip produced herewith can also serve as tolerance compensation. On contact with the window pane or with the body, this can deflect or be pressed in, without damage being able to occur to the pillar finisher or respectively window or to the body, and in particular without undesired noises occurring through the contact.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 shows an arrangement, known from the prior art, of a pillar finisher screwed to a post of a vehicle body, including the window drop seal associated with this construction;

FIG. 2 shows in a highly simplified illustration the required position of the window drop seal, connected with a horizontal door seal, relative to the pillar finisher;

FIGS. 3a to 4b show malpositions, occurring according to experience, of the arrangement shown in FIG. 2 and FIG. 1;

DETAILED DESCRIPTION

Figure 5:
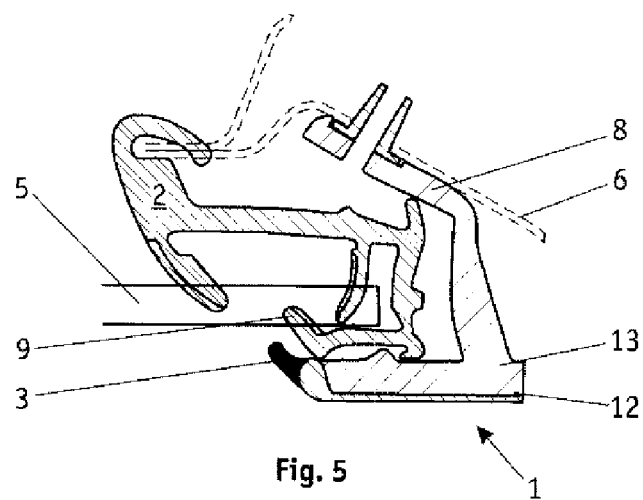
FIG. 5 shows a first embodiment of a pillar finisher with covering lip injected directly thereon.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

In FIG. 1, an arrangement known from the prior art is shown of a pillar finisher 1, screwed to a post 6 of a vehicle body, including the window drop seal 2 associated with this construction. The pillar finisher 1 embraces with a holding web 7, constructed in a U-shape, the body sheets forming the outer edge of the post 6, and is screwed via a fixing web 8 with the body post 6. The inner side of the pillar finisher 1, the fixing web 8 and the body post 6 form a mount for a window drop seal 2, in which the window pane 5 is guided.

On the side facing the exterior of the vehicle, the window drop seal 2 has a region constructed in a T-shape with a sealing lip 9, which is formed by the horizontal arm of the T-shaped region facing the window pane 5. The opposite horizontal arm of the T-shaped region, directed towards the exterior of the vehicle, forms a holding lip 10, which embraces the outer edge of the pillar finisher 1. The gap, due to the construction, between the pillar finisher 1 and the window pane 5 is thereby closed visually, is protected against penetrating water and in addition ensures an aerodynamically efficient transition between the window pane 5 and the outer surface of the pillar finisher.

FIG. 2 shows in a greatly simplified illustration the side view of the construction illustrated in FIG. 1. The pillar finisher 1 and the window drop seal 2, which is connected at its end on the upper side with a door frame seal 11 running substantially horizontally (not illustrated in FIG. 1), are aligned optimally to each other. The visible outer edges of the window drop seal 2 run over the entire length of the pillar finisher 1 parallel to the outer edges of the pillar finisher.

The door frame seal 11 and the window drop seal 2 are made from elastic soft plastic and form narrow, elongated components, the dimensional and fit tolerances of which can only be maintained relatively roughly. Through the inherent elasticity of the material, inaccuracies are scarcely to be avoided on installation. In addition to this are dimensional and fit tolerances in the pillar finisher itself. With regard to the position of the window drop seal 2 to the pillar finisher 1, tolerances of approximately ±2 mm are regularly to be expected. This leads not infrequently to the malpositions of the window drop seal 2 relative to the pillar finisher 1 shown in FIGS. 3a and 3b or respectively in FIGS. 4a and 4b.

FIG. 3a shows, on the basis of FIG. 2, a window drop seal 2 situated too far to the left by a few millimeters in the upper region of the pillar finisher; FIG. 4a shows a window drop seal 2 situated a few millimeters too far to the right. These malpositions result principally here from an undesired misalignment of the door frame seal 11, the absolutely positionally accurate installation of which is difficult for the reasons mentioned.

FIGS. 3b and 4b, which correspond to the cut-out A illustrated in FIG. 1, show the defective seat of the pillar finisher 1 and of the window drop seal 2 with respect to each other, regularly resulting from these malpositions, according to the section lines drawn in FIGS. 3a and 4a. As can be seen, an undesired gap (FIG. 3b) forms between the pillar finisher 1 and the window drop seal 2, or the window drop seal 2 is drawn behind the pillar finisher (FIG. 4b). In both cases, the correct seat of the functional seal 2 is not guaranteed and the problems occur which were mentioned in the introduction.

FIG. 5 shows a first possible embodiment to avoid the problem described above. The region of the window drop seal 2 directed towards the exterior of the vehicle is shortened and is drawn back behind the pillar finisher. The holding lip 10, still embracing the outer edge of the pillar finisher 1 in FIG. 1, is dispensed with. In its place, a covering lip 3, formed in an aerodynamically efficient manner directly onto the pillar finisher 1, is provided, which visually conceals the sealing lip 9. The covering lip 3 does not touch the window pane 5 here and therefore only fulfils a sealing function with regard to coarse dirt. Alternatively however, provision can also be made that the covering lip 3 is embodied in the manner of the sealing lip 9, projects up to the surface of the pane and forms a full-value seal.

The decisive factor here is that a malposition of the functional seal 2 no longer has any effects which are detectable externally. Independently of the malpositions of the functional seal 2 illustrated in FIGS. 3a/b and 4a/b, a faultless visual impression is ensured, and problems caused by the malposition during the use of the vehicle are as far as possible ruled out.

Figure 6:
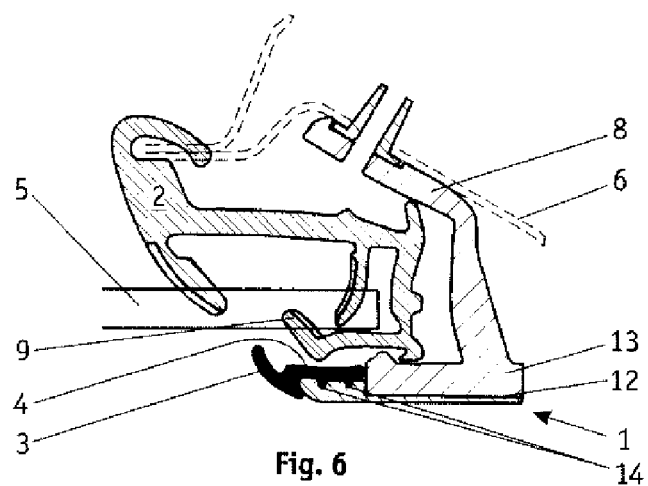
FIG. 6 shows a second embodiment of a pillar finisher with covering lip glued thereto.
Figure 7:
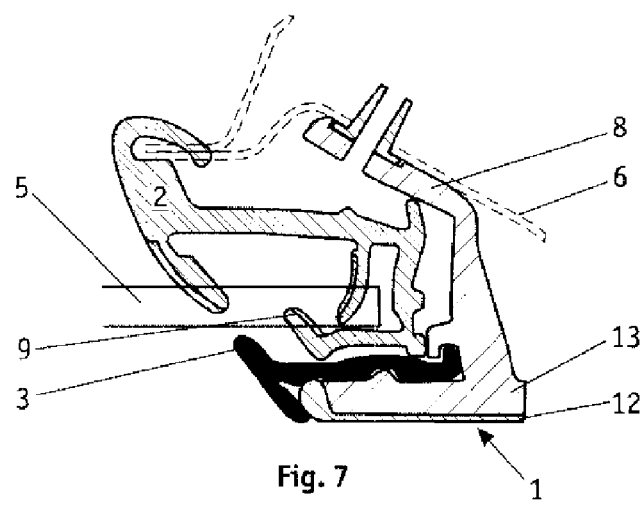
FIG. 7 shows a third embodiment of a pillar finisher with a sealing strip placed thereon, independent of the window drop seal, with covering lip.

FIG. 6 shows an alternative possibility for arranging a covering lip 3 on the pillar finisher 1. Here, the covering lip 2 is not injected directly on the pillar finisher 1, but rather is glued to it. Here, the covering lip 2 penetrates with small holding extensions 14 in recesses on the inner side of the pillar finisher 1, in order to ensure an even more secure hold. FIG. 7 shows a further possible embodiment of a covering lip 3 separated from the functional seal 2, in which the covering lip 3 is part of a sealing strip 4 in the manner of a rubber beading, which is inserted into the pillar finisher 1. On one side, the sealing strip 4 engages behind a holding collar formed on the fixing web 8, and on the other side it engages behind the edge of the pillar finisher 1. A disadvantage of the embodiment illustrated in FIG. 7, however, is that here the functional seal 2 and the sealing strip 4 require a relatively great overall height which, however, can be at least partly avoided in that the functional plastic layer is omitted in this region or is embodied so as to be distinctly thinner.

Moreover, the pillar finisher 1 illustrated in the Figures is constructed, as can be seen, in a multi-layered manner. On the outer side, i.e. on the surface pointing away from the vehicle, the pillar finisher 1 is formed by an exposed plastic layer 12. In the assembled state, this forms the surface influencing the visual impression, which from aesthetic considerations is intended to make as high-quality an impression as possible over the entire lifetime of the vehicle, and therefore is produced rather from hard, scratch-resistant plastics. The inner layer of the pillar finisher 1, which points towards the vehicle post 6, and is not visible from the exterior in the assembled state of the pillar finisher 1, is formed by a functional plastic layer 13. The plastic used for this layer requires material characteristics which do not readily reconcile with those required for the exposed plastic layer. The functional plastic layer 13 is therefore produced with a plastic which rather has ductile or viscoplastic characteristics. As can be seen from the figures, the covering lip 2 is preferably arranged on the exposed plastic layer or, as in FIG. 5, is injected directly thereon. The two layers of the pillar finisher are preferably molded in the same injection molding tool.

The invention claimed is:

1. A pillar finisher which is arranged to visually conceal regions of a vehicle body and with its outer exposed surfaces to be involved in forming the external appearance of a vehicle, wherein the pillar finisher in the intended final installed state forms a mount for a window drop seal, comprising:
   a covering lip, functionally separate from the position of window drop seal, is fixedly associated with the pillar finisher;
   wherein the covering lip is able to visually conceal the edge region of the window drop seal facing towards the exterior of the vehicle;
   wherein the covering lip engages over the edge region of the window drop seal facing towards the exterior of the vehicle;
   wherein the covering lip bridges the gap between the edge of the pillar finisher and the outer surface of the adjoining window pane of the vehicle.

2. The pillar finisher according claim 1 wherein the covering lip is a component of a sealing strip, separate from the window drop seal, which is securely connected with the pillar finisher.

3. The pillar finisher according to claim 2 wherein the covering lip is injected directly on the pillar finisher.

4. The pillar finisher according to claim 3 wherein the covering lip is produced from a soft plastic which differs from the material of the pillar finisher.

5. The pillar finisher according to claim 4 wherein the covering lip is connected with the pillar finisher and is positioned thereon such that the edge of the covering lip facing a window pane runs at a distance substantially parallel to the surface of the window pane.

* * * * *